US012802036B2

(12) United States Patent
Mckenzie

(10) Patent No.: US 12,802,036 B2
(45) Date of Patent: Nov. 17, 2026

(54) ELECTRONIC SYSTEM AND METHOD FOR MANAGING COMMERCIAL ACTIVITIES BETWEEN MEMBERS OF A NETWORK OF USERS

(71) Applicant: INCLOODME PTY LIMITED, Artarmon (AU)

(72) Inventor: David Alan Mckenzie, Artarmon (AU)

(73) Assignee: INCLOODME PTY LIMITED, Artarmon (AU)

( * ) Notice: Subject to any disclaimer, the term of this patent is extended or adjusted under 35 U.S.C. 154(b) by 90 days.

(21) Appl. No.: 18/694,383

(22) PCT Filed: Sep. 22, 2022

(86) PCT No.: PCT/AU2022/051146
§ 371 (c)(1),
(2) Date: Mar. 21, 2024

(87) PCT Pub. No.: WO2023/044540
PCT Pub. Date: Mar. 30, 2023

(65) Prior Publication Data

US 2025/0285081 A1 Sep. 11, 2025

(30) Foreign Application Priority Data

Sep. 22, 2021 (AU) ................................ 2021236504

(51) Int. Cl.
*G06Q 10/10* (2023.01)
*G06Q 10/087* (2023.01)

(52) U.S. Cl.
CPC ......... *G06Q 10/103* (2013.01); *G06Q 10/087* (2013.01)

(58) Field of Classification Search
CPC ............... G06Q 10/103; G06Q 10/087; G06Q 10/0633; G06Q 10/06311; G06Q 30/06;
(Continued)

(56) References Cited

U.S. PATENT DOCUMENTS 8,359,245 B1 * 1/2013 Ballaro .............. G06Q 30/0603 705/27.1
9,454,787 B1 * 9/2016 Dorr ...................... G06Q 10/40
(Continued)

OTHER PUBLICATIONS

ISA Australian Patent Office, International Search Report Issued in Application No. PCT/AU2022/051146, Nov. 23, 2022, WIPO, 8 pages.

(Continued)

*Primary Examiner* — Garcia Ade
(74) *Attorney, Agent, or Firm* — McCoy Russell LLP

(57) ABSTRACT

The present disclosure provides an electronic system for managing commercial activities between members of a network of independent system users. The system comprises: networked computing infrastructure, including one or more server or processor and a database of member data and member accounts for access by respective members and for communication with members via member computing devices. The networked computing infrastructure is configured to receive from any member, and/or transmit to any member, request or response data, e.g., relating to one or more objects to be subject to an activity via the system and/or relating to one or more activities to be carried out in respect of an object in the system. The system further comprises: a workflow execution framework or workflow execution module operated by the server or processor that manages a request and response process in respect of the one or more activities to be carried out between the members. The system may also comprise an object framework or module operated by the server or processor configured to identify and classify automatically an object nominated by a member to be subject to an activity via the system; and a
(Continued)

workflow execution framework or module operated by the server or processor that provides a workflow process to members for the one or more activities to be carried out in respect of an object in the system. The disclosure also provides a method of managing commercial activities between members of a network of independent system users via a networked computing infrastructure.

24 Claims, 6 Drawing Sheets

(58) Field of Classification Search
CPC ........ G06Q 40/00; G06Q 50/00; G06Q 50/18; G06Q 10/06; G06Q 10/08; G06Q 40/12; G06Q 10/40; G06F 2221/2145

See application file for complete search history.

(56) References Cited

U.S. PATENT DOCUMENTS

| | | | | |
|---|---|---|---|---|
| 2001/0032154 | A1 | 10/2001 | Schummer | |
| 2002/0128890 | A1* | 9/2002 | Dick | G06Q 10/06 705/7.26 |
| 2014/0052576 | A1 | 2/2014 | Zelenka et al. | |
| 2019/0318400 | A1* | 10/2019 | Luk | G06F 16/2264 |
| 2021/0082044 | A1 | 3/2021 | Sliwka et al. | |
| 2022/0391812 | A1* | 12/2022 | Leger | G06Q 10/06316 |
| 2024/0128890 | A1* | 4/2024 | Zhang | H02M 1/007 |
| 2024/0320193 | A1* | 9/2024 | Aziz | G06F 16/176 |

OTHER PUBLICATIONS

ISA Australian Patent Office, Written Opinion of the International Searching Authority Issued in Application No. PCT/AU2022/051146, Nov. 23, 2022, WIPO, 12 pages.

* cited by examiner

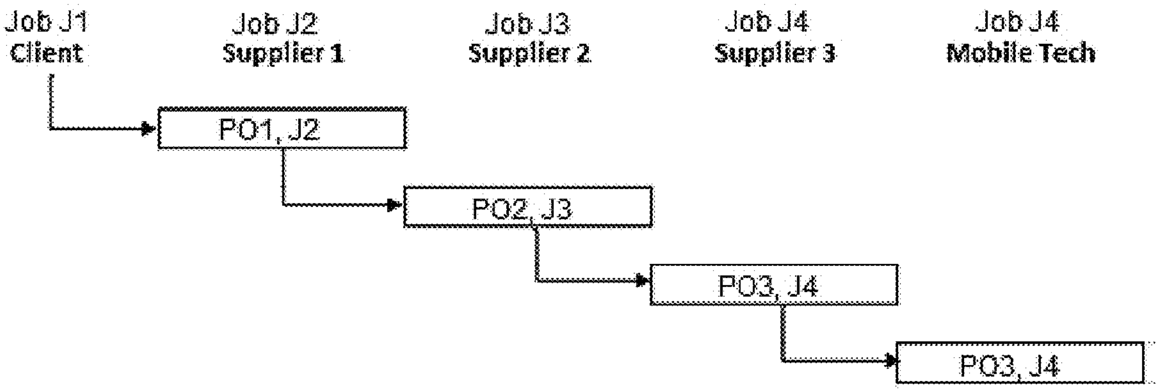

Fig. 6

| | Client | Supplier 1 | Supplier 2 | Supplier 3 | Mobile Tech |
|---|---|---|---|---|---|
| Action | New Job | | | | |
| Job Status | Next Allocate | | | | |
| Action | New Activity Request | | | | |
| Request Status | Waiting Response | | | | |
| | | | | | |
| Job Status | | Next Allocate | | | |
| Action | | Accept Request | | | |
| Action | | New Activity Request | | | |
| Request Status | | Waiting Response | | | |
| | | | | | |
| Job Status | Allocated | | | | |
| Request Status | Accepted | | | | |
| | | | | | |
| Job Status | | | Next Allocate | | |
| Action | | | Accept Request | | |
| Action | | | New Activity Request | | |
| Request Status | | | Waiting Response | | |
| | | | | | |
| Job Status | | Allocated | | | |
| Request Status | | Accepted | | | |
| | | | | | |
| Job Status | | | | Next Allocate | |
| Action | | | | Accept Request | |
| Action | | | | Schedule Job | |
| | | | | | |
| Job Status | | | Allocated | Allocated | |
| Request Status | | | Accepted | | |

Fig. 7

ELECTRONIC SYSTEM AND METHOD FOR MANAGING COMMERCIAL ACTIVITIES BETWEEN MEMBERS OF A NETWORK OF USERS

CROSS REFERENCE TO RELATED APPLICATIONS

The present application is a U.S. National Phase of International Application No. PCT/AU2022/051146 entitled "ELECTRONIC SYSTEM AND METHOD FOR MANAGING COMMERCIAL ACTIVITIES BETWEEN MEMBERS OF A NETWORK OF USERS," and filed on Sep. 22, 2022. International Application No. PCT/AU2022/051146 claims priority to Australian Patent Application No. 2021236504 filed on Sep. 22, 2021. The entire contents of each of the above-listed applications are hereby incorporated by reference for all purposes.

TECHNICAL FIELD

The present disclosure relates to an electronic system for managing commercial activities between members of a network of system users, and to computer implemented programs and methods for giving effect to such an electronic system.

More particularly, the present disclosure relates to systems and methods for the implementation of an electronic platform or exchange for managing and/or coordinating business and personal enterprise processes and communications between members of a user network. In this regard, the electronic platform or exchange is designed to support or provide structured data, organisational hierarchy, and business transaction workflows in an unlimited network map.

BACKGROUND ART

Any reference to background or related art, including to any documents, herein is intended to facilitate an understanding of the present disclosure only and shall not be considered as an admission that such background or related art forms part of the prior art, or that such background or related art is widely known or forms part of the common general knowledge in the relevant field in Australia or in any other country.

Although a number of electronic systems are known for supporting commercial operations of business, such as inventory management, accounting, and communication, and those systems have achieved wide-spread adoption within individual organisations, it will be appreciated that such systems are generally concerned with internal operations and efficiencies within those individual organisations.

Businesses and organisations globally are undergoing a digital transformation as technology advances in order to achieve the speed and agility necessary to compete and excel in today's business environment. As this digital transformation progresses, there is a need for new ways of interacting and doing business that can be adopted or employed by any business or organisation.

It would thus be desirable to provide a new electronic system and an associated method that is widely accessible to separate commercial entities or users within a network that is configured to facilitate and manage commercial interactions, services, and assets between any of those entities or users. For example, it would be desirable to provide an electronic system for workflow management and/or an electronic exchange for customer and supply chain management that is/are accessible to a range of separate commercial entities or users for coordinating or managing the commercial interactions between those entities or users as members of a network.

SUMMARY OF THE DISCLOSURE

According to one aspect, the present disclosure provides an electronic system for managing commercial activities between members of a network of independent system users, the system comprising:

- networked computing infrastructure, having at least one server or processor and a database of member data in member accounts for access by respective members, the networked computing infrastructure configured to enable and/or control communication between members via respective member computing devices,
- wherein the networked computing infrastructure is configured to receive from any member, and/or to transmit to any member, request or response data, e.g., relating to one or more objects to be subject to an activity via the system and/or relating to one or more activities to be carried out in respect of an object in the system; and
- a workflow execution framework or workflow execution module operated by the server or processor that manages a request and response process in respect of the one or more activities to be carried out between the members.

In an embodiment, each of the members can act as a requestor (e.g., customer) or a responder (e.g., provider of products and/or services) in a request and response process. Thus, the members effectively form a network of requestors and responders in a request chain or supply chain for products and/or services. The members are desirably collected in groups, with groups corresponding to organizations (e.g., companies) with which the members are associated. Each group may act as a requestor (e.g., customer) or a responder (e.g., provider of products and/or services), so that the groups preferably also form a network of requestors and responders in a request chain or supply chain for products and/or services. In this way, the system preferably forms an electronic exchange for customer and supply chain management.

Thus, the networked computing infrastructure is preferably configured to enable each member or group to communicate and interact with any other member or group, and especially to conduct business transactions with any other member or group, via their respective member computing device, such as a desktop computer or laptop computer. The member computing device may optionally also be a mobile computing device, such as a tablet or mobile smart phone. It will be noted that any of the members may be an individual or a natural person, or may also be a legal person, such as a company. The networked computing infrastructure may thus be configured to communicate with each of the member computing devices (i.e. each located remote from the server or processor of the networked computing infrastructure) via the Internet and/or a telecommunications network (e.g., a mobile telecommunications network). In an embodiment, the networked computing infrastructure includes a communication framework or communication module operated by the server or processor to enable and/or control communication between members via respective member computing devices, and configured to receive from any member, and/or to transmit to any member, the request or response data.

In an embodiment of the system, each member represents an individual person and forms a primary user entity of the system. A traditional licensing model for enterprise software applications is for a single organisation to manage the licenses for its users and pay on a per user/per month basis. If the same user is part of another organisation, they need to have a profile created and maintained in that system also attracting an additional licensing cost as well as unnecessary and undesirable duplication of data. In the system of the disclosure, the user/member ID and personal data (e.g., address, bank details, tax or super insurances, training data, etc.) are stored only once and then shared as desired. That is, in the present system, a distinct member profile is created once only. An individual member can be attached to an organisation (known as a "group") to which they belong or to multiple organisations/groups. They can have different functional and data access permissions in each group. A person with a single member ID can operate as employee and/or contractor under different terms and different roles and authorities in relation with multiple groups at the same time. Within the system, the user/member can elect which of their group profiles to operate and, in some cases, may even view data from multiple group profiles. As an approximate estimation of what this means, it is similar to the way an individual may switch in a banking application to view either personal or business accounts, but with the added ability to view part of a profile in another person's account in a controlled way. An advantage for each individual user/member is that their personal profile information remains their property permanently, even if they terminate their association within a particular group (e.g., by leaving a job). Also, links from their personal data shared with others outside the group remain valid. But their personal information, private notes, and documents remain their own property. Information of the group, to which they had access while part of the group, will no longer be accessible by them, however.

In an embodiment of the system, a group only needs to be created once within the system network. An organisation/group will have a single ID no matter what type of relationship it has or will have with any other organisations/groups. The information of, or connected with, each group, such as business details, insurances, etc., need only be entered once and maintained in one place for this entity. This information may optionally be shared with any other group through a request process. This arrangement provides several key benefits, including: (i) One group can operate as both a customer (requestor) and a provider of goods/services (responder) within the system or as a debtor or creditor in relationship with other groups in the system. Separate groups do not need to be set up for their different roles. (ii) New users of the system will be able to discover and link to existing groups without the need to recreate them as they would need to do in traditional business systems. In known systems, a host organisation would set up their own customer and responder lists. As a result, the same organisation may be represented in multiple host accounts even within the same platform. (iii) If group data is updated, then that information can be available for the whole network. This is particularly useful for data points like contact information, site addresses, and so on. Each group in the system can form a relationship with any other group through a request process. Specific data relating to the bi-lateral relationship is private to the two parties/groups (e.g., payment terms). Other data can be made publicly available. The group can determine what data can be made available to the network.

In an embodiment of the system, each member or group can operate in one of three principal roles in a relationship: (a) Requestor, i.e., initiator of a request, such as a "customer" role. This will typically be a group/organisation that is the ultimate approver of any work done and responsible for invoices to be paid. (b) Responder, i.e., a receiver of a request. This will typically be a group that performs (or sub-contracts) the requested job and/or supplies the requested item and is required to meet the requestor's requirements. The responder will usually create an invoice for payment. (c) Intermediary, e.g., request broker, assistant or "service desk" role. This will typically be a member or group that will have responsibility for processing a customer's request and managing responders to complete the required task/activity. The simplest request chain contains just requestor and responder, and the two parties interact directly. A requestor may, however. use an organisation/group to act as an intermediary and manage the process of delivery. In such a case, the requestor may have a direct relationship with the intermediary, and the intermediary may have a direct relationship with one or more responder. The request chain may also continue through additional levels. For example, a responder may employ a sub-contractor. In that case, the responder is also a requestor to the sub-contractor, who is then a responder at a lower level of the request chain in the wokflow process. It will be appreciated that the system is designed to support a multitude of such request chains or supply chain task and data requests occurring in parallel for all of the members or groups of the system.

In an embodiment, the workflow execution framework or workflow execution module is configured to provide linked or cross-referenced process stages of a workflow process to those members or groups connected or related in respect of a specific request chain for monitoring and coordinating fulfilment of each process stage of the request chain. To this end, a series of the linked or cross-referenced process stages provided by the workflow execution framework or module preferably passes or cascades between each of the members or groups connected or related in the specific request chain such that, upon completion or approval of a stage of the workflow process by one of the said members or groups, the next one of the said members or groups in the request chain is correspondingly informed and the process stages of the request chain are then updated automatically. Preferably, the workflow execution framework or module is configured to provide workflow process logic to members automatically, e.g., in one or more checklist, to assist members to make decisions (e.g., in approving a request, accepting a submitted document, accepting a data change, etc.), whereby the process logic provides relevant decision-making factors. The networked computing infrastructure in the system may be configured to record the member or group replies to or entries in the process logic, e.g., each checklist, to create a log of member or group decision-making.

In at least one embodiment, therefore, the disclosure provides an electronic data exchange configured as an electronic platform for a network of independent platform users, the platform being designed for managing commercial activities between the users, comprising: networked computing infrastructure, including at least one server or processor and a database for storing user data in user accounts for access by respective users, wherein the networked computing infrastructure is configured to control communication between users via respective user computing devices, wherein the networked computing infrastructure is configured to receive from any user, and to transmit to any user, request or response data relating to one or more objects subject to an activity or relating to one or more activities to be carried out in respect of the object(s) between the users via the platform; and a workflow execution module operated by the server or processor that manages a request and response workflow process in respect of the one or more activities to be carried out between the users in a request chain, wherein the workflow execution module provides a series of linked or cross-referenced process stages of the workflow process in respect of the request chain to monitor and coordinate fulfilment of each process stage of the request chain, wherein the series of linked or cross-referenced process stages of the workflow process passes or cascades between a plurality of levels of the users on a responder side, and/or optionally on a requestor side, of the request chain.

In an embodiment, the workflow execution module is configured for data entry by each of the platform users connected or related in the request chain regarding completion or approval of a process stage of the workflow process at a particular level with which that user is associated. Upon completion or approval of a process stage of the workflow process at a particular level, the workflow execution module is adapted to update the process stages of the request chain and to inform a next one of the users in the request chain automatically. Each of the users can act as a requestor or a responder in a request and response workflow process, such that the users form a network of requestors and responders in the request chain, and the platform is an electronic exchange for supply chain management. The levels in the request chain or supply chain typically reflect stages of a workflow process upon which other stages are dependent for successful completion of the process.

The electronic system of the present disclosure is preferably referred to as a "network exchange platform", as this expression neatly encapsulates the key concepts of (i) the interrelationships of the network users or members, (ii) the data exchange that occurs between the users or members of the network, and (iii) the operational support provided by a platform to all of the network users or members. In this way, the electronic system of the disclosure connects, organizes, and supports the users in their operations.

The system or network design preferably treats every organization or group as a node in the network with which any other organization or group can form a relationship, share data, and/or transact on the same platform. Within an organisation or group, the individual members can be arranged in a hierarchical organisational chart structure that reflects the reporting and structure of the particular organisation.

In an embodiment, the system further comprises an object framework or object module operated by the server or processor and configured to identify and classify an object nominated by a member or group to be subject to an activity via the system, and preferably automatically. Each object may be an item of information and is preferably selected from the group consisting of: a member, a job order, a quote, an estimate, an information request, a proposal request, an activity request, a document, an address, a note, a diary, an asset, an invoice, a payment, a budget, a purchase order, an adjustment, and/or an account. Each object has a single identifier in the system and can be linked via the system in one or more relationships with any other object.

In an embodiment, the object framework or object module is configured to identify and/or to classify an object nominated by a member in at least one category. The category may include one or more of: a relationship to a member, a document, a calendar item, an activity, a request, a physical item, a communication, and a financial transaction. In this regard, each category may have sub-categories that define one or more of: (i) a target status, being a benchmark status or value for the object; (ii) an active status, being a current status or value of the object; and (iii) a score, being a comparison of the active status with the target status.

In an embodiment, the object framework or object module is configured to present object data to a member in different modes. For example, the object framework or module may include a mode in which a member may define or create object data for a new instance of an object (i.e., "new" mode), such as a new job, a new invoice, a new member, or the like. The object framework or object module may also include a mode in which a member may modify or edit the data associated with an object (i.e., "change" mode), such as a change in job scope, in job cost, in job completion date, or the like.

In an embodiment, the object framework or module enables related objects to be linked in object collections or object hierarchies, whereby a collection is owned at a group level by the member. Preferably, the object framework or module is configured to allow objects to be added or removed from a collection at any time, wherein collections can be used to manage objects at scale (e.g., a maintenance routine may apply to a collection of assets and/or to a collection of locations). Preferably, the object framework or module is configured to allow a hierarchy to be created between objects by setting a parent of an individual object. Examples of such object hierarchies include (a) a job hierarchy of job/sub-jobs/jobs allocated to techs etc., (b) a contact hierarchy of reporting or organisational structure, and (c) an asset hierarchy of assets on site grouped by category/location/etc.

In an embodiment, the object framework or object module is adapted to allow members to define relationships between objects of different types and to make these available to authorised members in the network. In this regard, the system may include a selection tool that allows a member to search and select objects of a certain type to link to an existing object. For example, certain assets may be selected and linked to a job to indicate which assets are to be used or inspected on the job. The selection creates the object-linking relationship. Preferably, a control table establishes or determines which object types may be linked for a specific object type. The object framework or module may further be adapted to allow a member to "share" an object with one or more members outside of an object ownership group to provide those outside members access to the object.

In at least one embodiment, therefore, the disclosure provides an electronic data exchange configured as an electronic platform for a network of independent platform users, the platform being designed for managing commercial activities between the users, comprising:

networked computing infrastructure, comprising one or more processors or servers and a database storing user data in user accounts for access by respective users, wherein the networked computing infrastructure is configured to control communication between users via respective user computing devices, wherein the networked computing infrastructure is configured to receive from any user, and to transmit to any user, request or response data relating to one or more objects to be subject to an activity or relating to one or more activities to be carried out in respect of the object(s) between the users of the platform;

an object module operated by the one or more processors or servers and configured to identify and classify automatically an object nominated by a member to be subject to an activity via the system, wherein the object module is configured to classify the object nominated by a member in at least one category, including one or more of: relationship to a user, document, communication, physical item, activity, calendar item, request, and financial transaction, and wherein each category includes sub-categories that define one or more of: (i) a target status, being a benchmark status for the object; (ii) an active status, being a current status of the object; and (iii) a score, being a comparison of the active status with the target status; and a workflow execution module operated by the one or more processors or servers that provides a workflow process to users for the one or more activities to be carried out in respect of the object(s) between the users of the platform.

In an embodiment, the system further comprises a member role and permission framework (or member role and permission module), operated by the server or processor, for regulating or controlling functional access, data visibility, and notification of data and events in the system. The member role and permission framework or module is adapted to assign or designate roles and permissions to members within a group at an activity level; e.g., in order to identify or designate which member(s) may perform a job request, or which member(s) may perform or authorise an invoice payment, or the like. In this regard, the member role and permission framework or module preferably includes a number of role and permission levels, which may optionally be selected from the group. These role and permission levels may, for example, identify or designate a member as: Relationship, Visible, Responsible, Accountable, Authorised, Consulted, and/or Informed. In this way, members having a designated role can be granted access to data and system functions according to their role. Therefore, a member designated in an "Informed" role may be informed via access to data, notifications, etc., but may have no ability to perform an activity on any object.

In an embodiment, the electronic system further comprises: a computer program product configured for installation and operation on each member computing device to communicate and interface with the networked computer infrastructure. In this regard, the computer program product may be configured, when installed and operated on each member computing device, to enable members to perform one or more of, and preferably each of, the following functions, operations or steps:

- access a member account in the system;
- define and/or modify objects within a member account;
- receive and record workflow process logic; e.g., via one or more checklist;
- define and/or modify roles and access permissions within a member account;
- communicate and interact with any other network member via the system, including:
  - send or accept or modify a proposal; and/or
  - send or accept or modify a job request; and/or
  - set or modify a job schedule; and/or
  - track stages of a job's progress; and/or
  - allocate resources with respect to a job; and/or
  - send or accept or modify an invoice; and/or
  - transmit funds to settle a financial obligation.

According to another aspect, the disclosure provides a computer program product configured for installation and operation on a plurality of member computing devices to communicate and interface with the networked computer infrastructure of an electronic system according to any of the embodiments disclosed above for managing commercial activities between members of a network of system users, where the networked computer infrastructure includes: at least one server or processor, and a database of member data including member accounts for access by respective network members. The computer program product, when installed and operated on each member computing device, is configured to perform one or more of, and preferably each of, the following functions or operations or steps:

- access a member account in the system;
- define and/or modify objects within a member account;
- receive and record workflow process logic; e.g., via one or more checklist;
- define and/or modify roles and access permissions within a member account;
- communicate and interact with any other network member via the system, including:
  - send or accept or modify a proposal; and/or
  - send or accept or modify a job request; and/or
  - set or modify a job schedule; and/or
  - track stages of a job's progress; and/or
  - allocate resources with respect to a job; and/or
  - send or accept or modify an invoice; and/or
  - transmit funds to settle a financial obligation.

According to yet another aspect, this disclosure provides a computer program, including one or more instructions to be executed in a computing infrastructure for implementing a system according to any one of the embodiments described above.

According to still a further aspect, the disclosure provides a method of managing commercial activities between members of a network of independent system users via a networked computing infrastructure, including at least one server or processor and a database storing member data in member accounts for access by respective members, the method comprising:

- enabling or controlling with the server or processor communication between members of the network via respective member computing devices,
- receiving from any member, and/or transmitting to any member, request or response data, e.g., relating to one or more objects to be subject to an activity and/or relating to one or more activities to be carried out in respect of an object; and
- managing with the server or processor a request and response process in respect of the one or more activities to be carried out between the members.

In an embodiment, each of the members is a requestor (e.g., customer) or a responder (e.g., provider of products and/or services) in a request and response process, and the members form a network of requestors and responders in a request chain or supply chain for products and/or services, whereby the method provides for customer or supply chain management.

In an embodiment, the members are collected in groups, the groups correspond to organizations (e.g., companies) with which the grouped members are associated; and each group is a requestor (e.g., customer) or a responder (e.g., provider of products and/or services). The groups form a network of requestors and responders in a request chain or supply chain for products and/or services.

In an embodiment, the request and response process includes linked or cross-referenced process stages of a workflow process to members or groups connected or related in respect of a specific request chain for monitoring and coordinating fulfilment of each process stage of the request chain.

In an embodiment, a series or each of the linked or cross-referenced process stages passes or cascades between each of the members or groups connected or related in the specific request chain such that, upon completion or approval of a stage of the workflow process by one of the said members or groups, the next one of the said members or groups in the request chain is correspondingly informed and the process stages of the request chain are updated automatically.

In an embodiment, the workflow process includes a checklist of steps to members or groups in each request and response process to provide members or groups relevant decision-making factors, whereby the method includes recording member or group replies or entries to the checklist to create a log of member decision-making.

An embodiment of the electronic system of the present disclosure created by the present inventor is referred to herein as the INCLOOD™ system. The INCLOOD™ system is an electronic exchange or platform (a network exchange platform) and software application, that fundamentally addresses two core problems in the field of business communication and activity. These problems are: 1. barriers to exchange of data between multiple parties, and 2. difficulties in organising data. The INCLOOD™ system offers solutions to these issues by providing a system architecture that enables standardised approaches to these two problem areas. In the INCLOOD™ system, information is handled as objects which can be linked to one or more other objects in a consistent way. Objects can be linked to external systems through integration processes and may hold references to the data record in the external system. This allows the INCLOOD™ system to operate as a data exchange between external systems using the object structure as a common intermediate data layer. Solution 1: The INCLOOD™ system provides tools and interfaces to allow organisations and people to communicate through a variety of means, sharing transactional data, communication data and electronic files (e.g., documents and images). Solution 2: The INCLOOD™ system provides a standardised toolset to simplify the organisation of all kinds of information.

BRIEF DESCRIPTION OF THE DRAWINGS

The above and further features of the present disclosure are more fully described in the following description of several non-limiting embodiments thereof. This description is included for the purposes of exemplifying the disclosure. It should not be understood as a restriction on the broad summary or description of the disclosure as set out above. The following description is made with reference to the accompanying drawings, in which like reference signs designate like parts and in which:

FIG. 6 is a schematic representation of change in an object's status in a request chain (e.g. Job or Quote requests) through multiple levels of responders propagating up and down (along) the request chain according to system rules;

FIG. 7 is a schematic representation of a request process showing status change propagating along the request chain—e.g., through the levels of the users;

Figure 1:
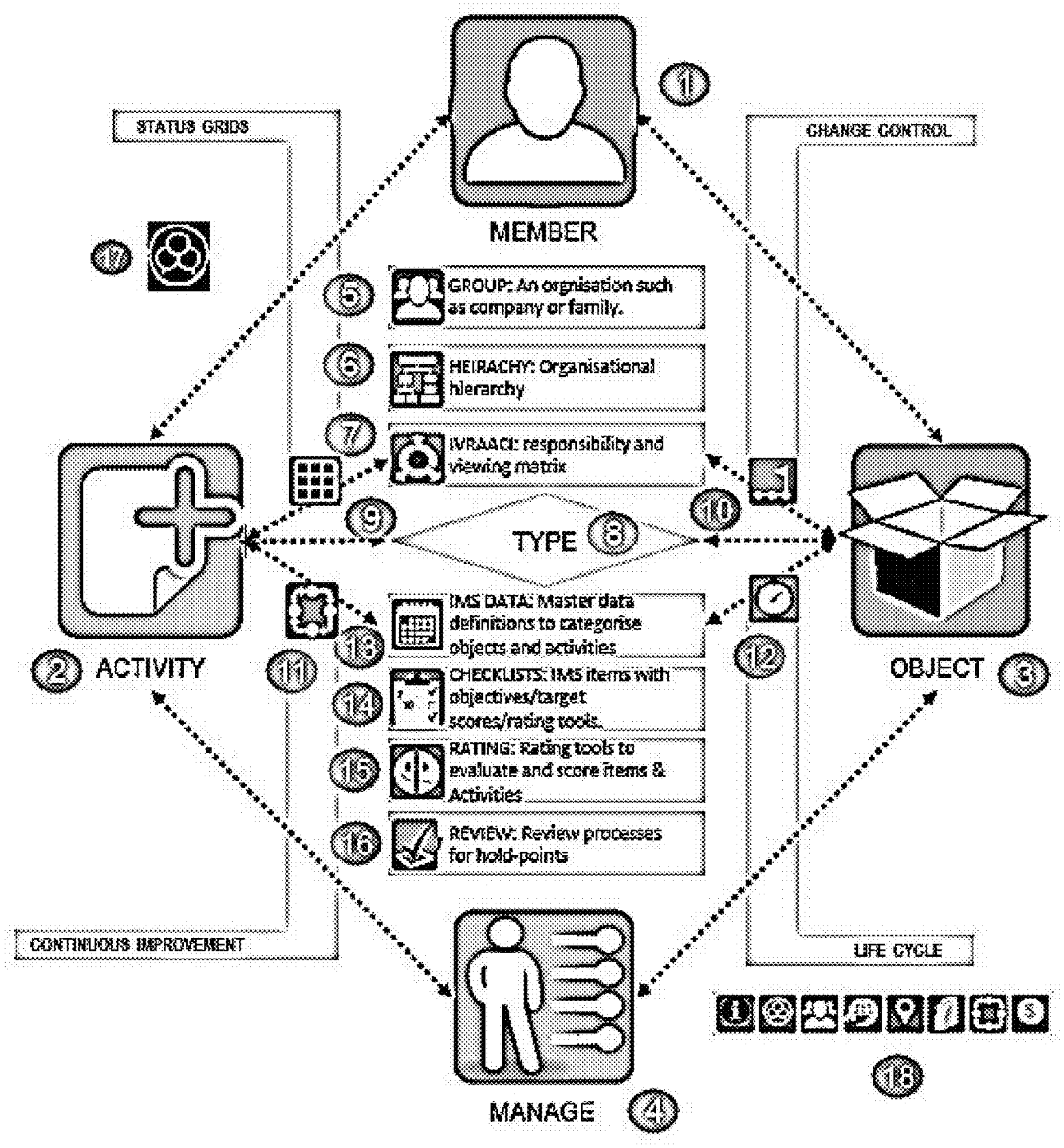
FIG. 1 is schematic representation of an electronic exchange or platform (network exchange platform) adapted for managing commercial activities between members of the system in accordance with an embodiment of the disclosure.

The accompanying drawing figures are included to provide further understanding of the present disclosure and are incorporated in and constitute a part of this specification. The drawings illustrate particular embodiments of the disclosure and together with the description serve to explain the principles and operation thereof. Other embodiments of the disclosure and many of the attendant advantages will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. It will also be understood that certain actions and/or steps in an embodiment of a method may be described or depicted in a particular order of occurrences while those skilled in the art will understand that such specificity with respect to sequence may not actually be required.

DETAILED DESCRIPTION OF PREFERRED EMBODIMENTS

Definitions Before describing the system and method of this embodiment in more detail, it is instructive to provide some definitions that are helpful to clarify the embodiment described with reference to the drawing figures. It will be understood that the definitions are provided solely to allow the reader to better understand the embodiments described herein, and are not intended to be limiting on the broader inventive concept.

INCLOOD™ system—an electronic exchange or platform and software application for managing commercial activities between members of a network of system users forming a customer and supply chain management system.

Member/User—a person or an entity registered as a user, member, or group of the INCLOOD™ system, being a customer or purchaser and/or provider of products and/or services in a network of customers, contractors and sub-contractors in a supply chain for the said products and/or services through the INCLOOD™ system.

INCLOOD™ application—a computing software application that may be installed or operated on a desktop or laptop computer, on a tablet, or a smartphone device. The INCLOOD™ system may provide a web application accessible via web browser.

INCLOOD™ account—an account of a member in the INCLOOD™ system.

Object—an item of information in the INCLOOD™ system preferably selected from the group consisting of: a member, job order, quote, estimate, information request, proposal request, activity request, document, address, note, diary, asset, invoice, payment, budget, purchase order, adjustment, or account. Each object has a single identifier in the INCLOOD™ system and can be linked in the INCLOOD™ system in one or more relationships with any other object of the INCLOOD™ system.

Activity—a task to be performed in relation to an object in the INCLOOD™ system.

System Overview Broadly, this embodiment relates to an electronic system or an electronic exchange known herein as the INCLOOD™ system or simply as "INCLOOD™". This system is an open platform/ecosystem for exchanging information and organising, communicating, and managing tasks, especially commercial activities between members, in an unlimited network of people, organisations, and systems. In this way, an ecosystem can be defined as a dynamic structure of different interdependent, yet autonomous actors, who coordinate their complementary activities towards a shared purpose to co-create value. The members are configured to interact with one another within the INCLOOD™ system via their own member computing devices and a communications network. The system thus allows the individuals or entities registered in the system as members (users) to communicate, to interact, and to manage business transactions via a common platform. The INCLOOD™ system, in this embodiment, may be cloud-based (e.g., provided in a virtual private cloud) and comprises a server (not shown) having at least one processor, random access memory (RAM), primary storage, and a database configured to receive, store and manage member data and/or information processed by the processor. The database is arranged to receive and transmit information via a communications network, such as the Internet (e.g. via a mobile or wireless network), to and from remote member computing devices. Thus, the INCLOOD™ system in the embodiment of this disclosure concerns the architecture and implementation of a Universal Social Enterprise Activity & Information Organisation Platform (USEAIOP or "Eco-Platform") designed to facilitate business and personal organisation processes and communications with structured data, organisational hierarchy, and business transaction workflows in an unlimited network map.

With reference to FIG. 1 of the drawings, the INCLOOD™ system is configured to involve each of the following four core task components in managing any task: Member (i.e. the person or entity performing the task), Activity (i.e., the task being performed), Object (i.e., an object in respect of which the task is performed), and Manage (i.e. the system tool(s) to control, rate and organise the task information). With reference to FIG. 1 of the drawings, the manners in which these four components interact in the INCLOOD™ system and are associated with various tools and processes of the system are illustrated schematically. The reference numbers shown in drawing FIG. 1 (in ovals) are described in Table 1 below:

TABLE 1

Reference numbers shown in FIG. 1.

| Ref | Component Name | Description |
|---|---|---|
| 1 | Member | Individual person or entity |
| 2 | Activity | An action or event |
| 3 | Object | A physical item, document, asset |
| 4 | Manage | Management tools and processes of the system |
| 5 | Group | An organization, such as a company, team, family |
| 6 | Hierarchy | An organizational hierarchy of people, objects, or things |

TABLE 1-continued

Reference numbers shown in FIG. 1.

| Ref | Component Name | Description |
|---|---|---|
| 7 | iRVRAAUCI | Responsibility and viewing matrix controls |
| 8 | Type | Core object entities/categories |
| 9 | Status Grids | Grids showing summary counts of object status. |
| 10 | Change Control | Management controls and processes around status and information changes, |
| 11 | CIS | Continuous Improvement System engine. |
| 12 | Life cycle | Life-cycle status for objects and activities. |
| 13 | IMS Data | Integrated Management System (IMS) - Master data definitions for all organizational of objects and activities. |
| 14 | Checklists | Collections of IMS items with objectives, target scores and rating tools. |
| 15 | Rating | Rating tools to evaluate and score items and activities. |
| 16 | Review | Review processes for hold points. |
| 17 | Multi-tool | User interface toolbox component for use in launching all tools and lists |
| 18 | List View | Object list grids with collapsible column groups by object category and sub-category. |
| 19 | Library | Community repository of documents and assets |

The concepts underpinning the design and operation of the INCLOOD™ system are summarized below:

Member-Centric System: Individual members are core entities in the INCLOOD™ system. The INCLOOD™ system interconnects the members in the network, shares their information in member and group relationships and ensures the personal ownership and control of that information. A member identity framework enables users to have multiple profiles allowing them to be associated with multiple groups that mirror their work and life roles. Each member can view data for one or more profiles simultaneously, thus enabling a unified view of their interactions, calendar tasks, and so on. On logging into the system, each member can choose which profile(s) they want to view for the current session. The selected profile will affect the data and documents to which they have access during the session. Members can form managed relationships with any organizational group or other member in the network. Members can communicate, rate, share information and control access in a multi-lateral way.

Referring to FIG. 1, each member represents an individual person and forms a primary user entity of the INCLOOD™ system. The user/member ID and data are stored only once and then shared as desired. That is, in the INCLOOD™ system, the individual member profile is created once only. A member can be attached to an organization or "group" to which they belong (e.g. as an employee) or to multiple organisations or groups. An advantage for each member is that their personal profile information remains their property, even if they terminate their role within a particular group (e.g., by leaving a job). A group also only need be created once within the INCLOOD™ network. An organization/group will have a single ID no matter what type of relationship it has or will have with any other organisations/groups. This provides key benefits, including: (i) One group can operate as both a customer (requestor) and a provider of goods/services (responder) within the INCLOOD™ system and separate groups do not need to be set up for their different roles. (ii) New users of the system will be able to discover and link to existing groups without the need to recreate them as they would need to do in traditional business systems. (iii) If group data is updated, then that information is available to the whole network. This is particularly useful for data points like contact information, site addresses, and so on. Each group in the system can form a relationship with any other group through a request process. Specific data relating to the bi-lateral relationship is private to the two parties/groups (e.g., payment terms). Other data can be made publicly available and each group can determine what data is to be made available to the network.

Figure 2:
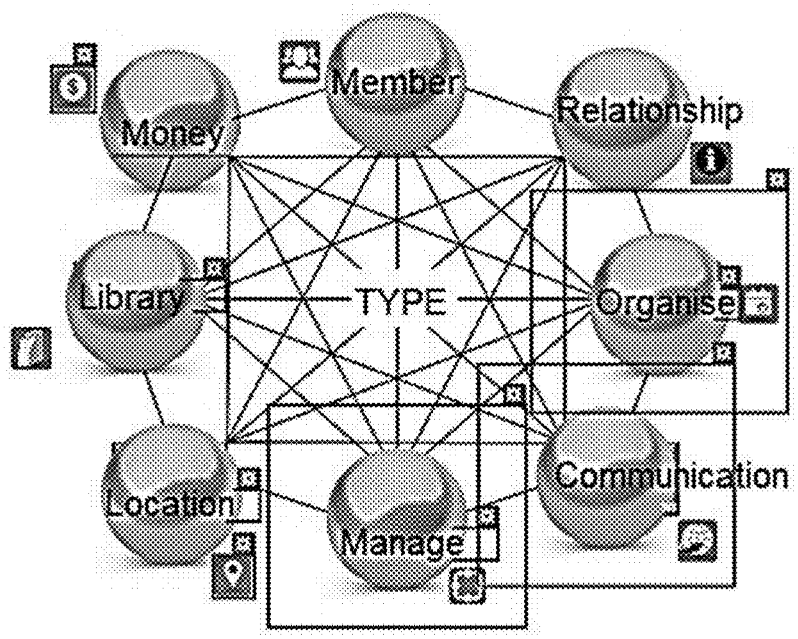
FIG. 2 is a schematic representation of an object of the system of FIG. 1 identified and classified via a selection of categories.
Figure 3:
FIG. 3 is an illustration of the functionality, connectivity, and tools of the system in high-level areas according to an embodiment.

Object Framework/Object Module: All data in the INCLOOD system is organized and handled as an "object" which can interact and have relationships with other objects. Each object has a single discrete identifier (ID) and can be linked in relationships with any other object potentially. The system data is organized into multiple object types (e.g., Job, Quote, Asset, Invoice) which can be further organized in one or more of eight main categories (i.e., Relationship, Community, Organiser, Communication, Location, Library, Manage, Money) depending on the object. Examples of these object categories and how they can be applied, such that an object is identified and classified via a selection of categories, are illustrated in FIG. 2 of the drawings and include:

Members/People and Organisations (Community)
Relationship
Physical items (Library)
Activity types (Organiser)
Calendar items (Organiser)
Documents (Library)
Requests between parties (Communication)
Assets (Location)
Financial Transactions (Money)

The design goal is to have each object type behave and present information in a consistent way with a single set of tools to create, update, share and manage data. All objects have their associated properties and linked data organized into the eight system categories in the framework. Within each category are three common sub-categories, namely: "Target", being the target or budget information for the object, "Active" being the current value of the object, and "Score", providing a measure of "Active" against "Target". As all data items are represented as objects, objects of different types can be associated and linked to provide logical groups of objects (such as on an object card). Objects of different types may also be related to each other. Essentially any number of objects of any type can be related to any other object, subject to access and visibility controls. Object rows in a list can also be "drilled-down" to reveal detail rows for a specific field. For example, the total number of hours worked on a job may be represented as a single number in a row in a job list. The user can click on that field and reveal a sub-list of all hours recorded on that job.

Objects have a lifecycle that reflects the status of the object itself. Thus, objects pass through a series of statuses in their lifecycle from inception to closure. A change of status can be a significant transition and may be dependent on rules, member authority, limit checks (e.g., $ approval limits) and so on. Status summaries (called Status Grids) display counts of objects at each status accessible to the user. A user may be required to complete a checklist (object rating list) successfully to be able to advance to the next status. Asset-type objects, for example, may be linked to a lifecycle status (e.g., install, maintain, replace, etc.) enabling the linking of different workflow processes or checklists to an asset activity according to the appropriate lifecycle. For example, a routine calendar system may facilitate the creation and execution of proactive maintenance schedules for selected assets. Field workers can complete lifecycle-specific checklists during inspection and then create reports and record photos to build up a history of an asset's life. The Continuous Improvement System (CIS) can be used to address defects and/or to schedule ongoing preventative action. Financial budgets and cost-tracking can also help determine asset visibility and end-of-life prediction. Table 2 below describes the main data objects used in the INCLOOD™ system.

TABLE 2

Principal object data types in the INCLOOD ™ system

| Object Type | Description |
|---|---|
| Group | Organisation such as company, team, family |
| Member | Individual person |
| Job | Core object for requesting and managing activity |
| Quote | Like a job, but oriented to providing a quote to the requestor. If accepted, the quote becomes a job for the execution of the task. |
| Information Request | A request for information that may be required for compliance or safety purposes |
| Proposal Request | A request to a Responder for a quote |
| Activity Request | An individual request for work to a Responder. There may be multiple activity requests on a job. The Activity Request holds the cost of the task. |
| Access Request | A request to provide access to specific objects owned by the responder. |
| Document | A document record includes stored documents, photos, and links to document records in other systems. |
| Address | A physical location |
| Note | A note that can be attached to any object. Notes have type and visibility. Includes text, audio, and video notes. |
| Diary | A task with a specific start date, time, duration, and status to be performed by a member. Always associated with a job and a location. |
| IMS Item | Master information item providing Group/Category/Item information and activity or item descriptions for use by other objects. |
| CIS Item | Continuous improvement item - an object that facilities a continuous improvement workflow that can be attached to any other object type. |
| Asset | Physical item. |
| Routine | Object to manage jobs on a schedule such as a recuring tasks or a preventative maintenance program. |
| Object Item | Planning task that can be arranged in a sequence with start and end dates, assignments, and costs. Can be linked with other tasks to form a program that can be represented on a Gantt chart. |
| Estimate | A multi-line estimate containing individual items with quantities and costs. |
| Invoice | Invoice |
| Payment | Invoice payment |
| Budget | Budget |
| Purchase Order | Requestor purchase order |
| Object Rating List | Inspection and test Plan (Checklist) |
| Adjustment | Financial adjustment |
| Account | General Ledger Account |

The following Table 3 then illustrates examples of how object categories in FIG. 2 can be applied to identify and classify a range of objects within the INCLOOD™ system.

TABLE 3

Examples of object categories in FIG. 2.

| Category | Description | Example |
| --- | --- | --- |
| Relationship | Information pertaining to how an object is related to other objects. e.g., An order number is an object associated with a job, with a member or group requesting the order (requestor), with an activity. | Order number on a job<br>GL-code<br>Invoice reference<br>IVRAUCCI<br>Hierarchies/object maps<br>Requestor > Job– > Activity<br>Request > Responder<br>Job > Sub Job<br>Organizational Structure<br>Asset parts.<br>Activity, Object, and member |
| Community | People (members) and organisations (groups) associated with the object. | Job customer, site contact, invoice approver, object creator<br>Information Requests |
| Communication | Information related to communicating with another party, notes and requests. | Activity requests<br>Proposal requests<br>Notes<br>Reminders<br>Notifications<br>Invitations<br>Emails<br>Calls and Video links |
| Organiser | Time-related information such as time records, due dates, expiry dates | Attendance records,<br>Asset expiry date<br>Job completion due date,<br>Task percentage complete<br>Activity List<br>Availability<br>Labour Management |
| Location | Information related to an object's location | Document folders<br>Asset location<br>Job site location. |
| Library | Document and asset records | Resources - forms, procedures<br>Records<br>Job completion photo<br>Versioned documents<br>Photos<br>Videos<br>Recorded phone messages<br>Insurance certificate<br>Compliance documentation<br>Registers<br>Asset details |
| Manage | Information related to the categorisation of the object, the status of the object and other object ratings. | Object status<br>Object ratings<br>CIS (continuous improvement items),<br>IMS Group/Category/Item<br>Target ratings<br>Scores |
| Money | Financial information | Job limits<br>Cost & rates<br>Sell rates<br>Quoted amounts<br>work-in-progress calculations<br>Margin calculations<br>Invoices<br>payment amounts<br>Asset depreciation calculations |

Figure 4:
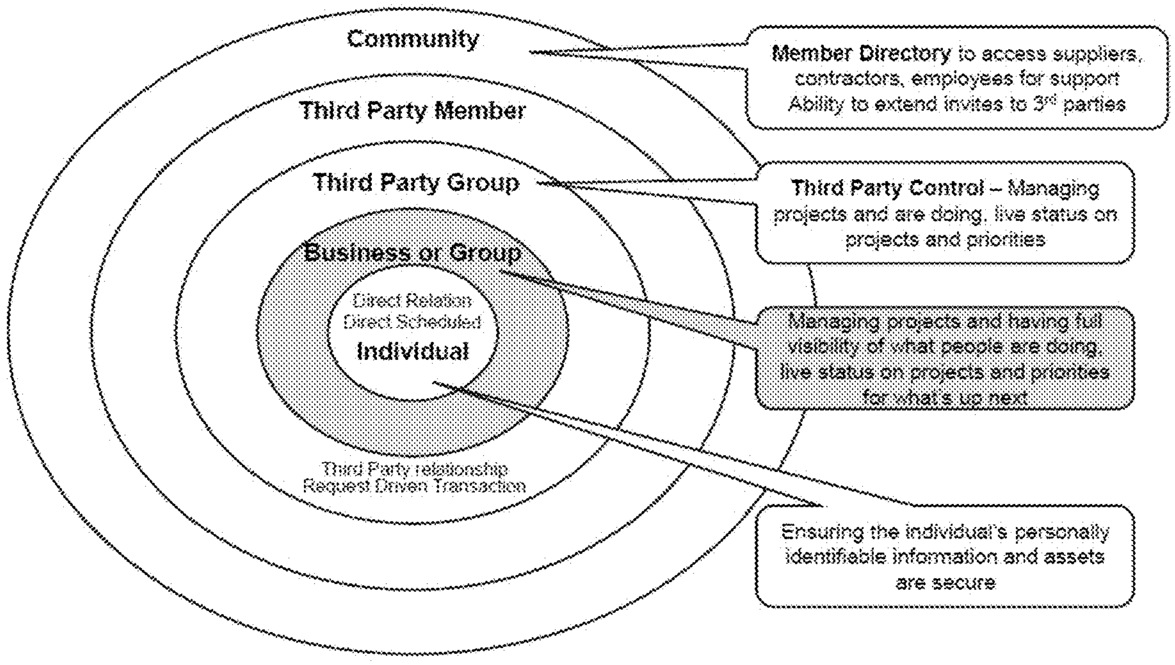
FIG. 4 is a schematic representation of the user-centric nature of the INCLOOD™ system.

Referring to FIG. 4 of the drawings, the user-centric nature of the INCLOUD™ system is represented schematically. Thus, an individual member has a personal profile and has full control over personally identifiable information and assets. Each group is an organisational entity with associated members and is able to manage projects and have supply-chain visibility. The "third party groups" are other organisations or groups in the network (e.g., requestors and responders) who are able to manage projects and have supply-chain visibility. They interact with other groups through request processes and sharing controls. The "third party members" are individuals linked to third party groups. Each third-party group manages its own members, but activity and data can be shared outside the group. The "community" refers to the members in the wider INCLOOD™ system community. They can be invited to join existing groups and there is no limit to the number of groups a member can be associated with.

Each group typically operates in the INCLOOD™ system in one of three principal roles in a relationship: (a) Requestor, i.e., initiator of a request, such as a "customer" role. This will typically be a group/organisation that is the ultimate approver of any work done and responsible for invoices to be paid. (b) Responder, i.e., a receiver of a request. This will typically be a group that performs (or sub-contracts) the requested job and/or supplies the requested item and is required to meet the requestor's requirements. The responder will usually create an invoice for payment. (c) Intermediary, e.g., request broker, assistant or "service desk" role. This will typically be a member or group that will have responsibility for processing a customer's request and managing responders to complete the required task/activity. The simplest request chain contains just requestor and responder, and the two parties interact directly. A requestor may, however. use an organisation/group to act as an intermediary and manage the process of delivery. In such a case, the requestor may have a direct relationship with the intermediary, and the intermediary may have a direct relationship with one or more responder. The request chain may also continue through additional levels. For example, a responder may employ a sub-contractor. In that case, the responder is also a requestor to the sub-contractor, who is then a responder at a lower level of the request chain. The INCLOOD™ system or network design treats every organization or group as a node in the network with which any other organization or group can form a relationship, share data, and/or transact on the same platform. Within each organisation or group, the individual members can be arranged in a hierarchical organisational chart structure that reflects the reporting and structure of the particular organisation.

Figure 5:
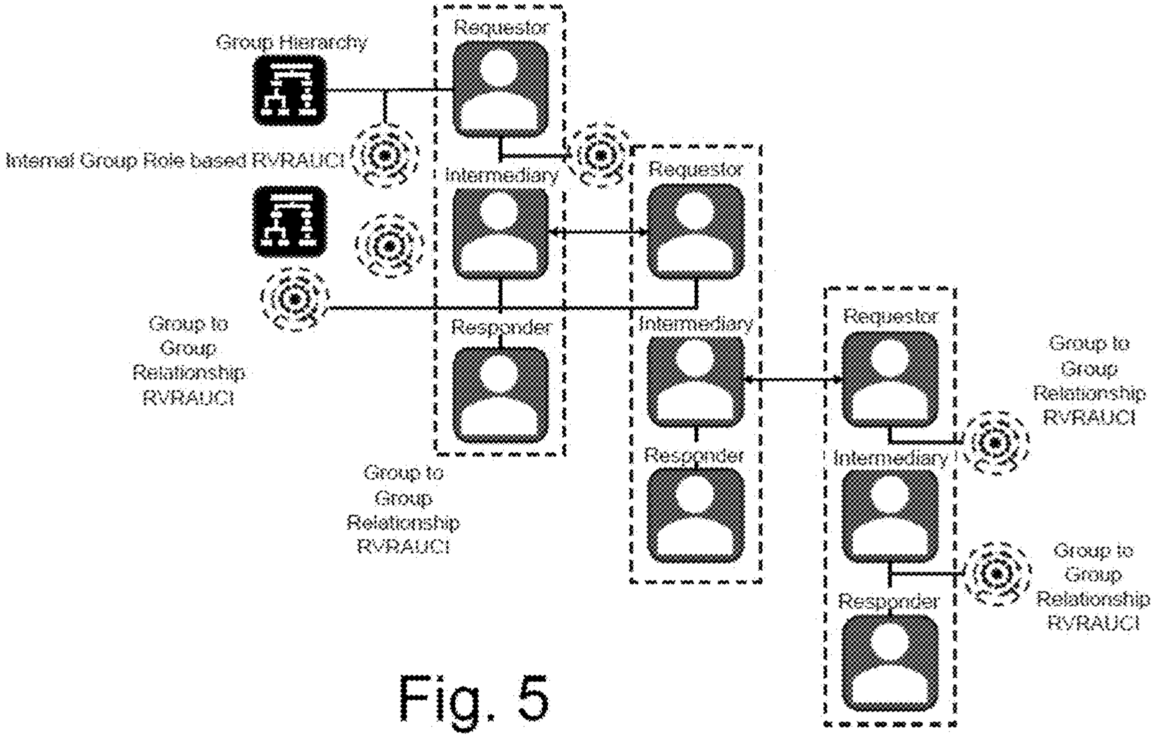
FIG. 5 is a schematic representation of an example of multi-lateral relationships within a request chain in the INCLOOD™ system.

With reference to drawing FIG. 5, the INCLOOD™ system is designed to support an endless supply chain for task and data requests. For example, a group (the Requestor) may create a job request for another group (the Responder) to respond to. This process of assigning an activity or collection of activities is called Allocation. The responding group may themselves allocate a request to a third-party responder who may then allocate the request to others still. At each level in the hierarchy of tasks, organisations can add their own contingencies (e.g., cost margins and time buffers) and documentation requirements to ensure satisfactory delivery of the product or service. As each responder organisation/group performs the requested tasks and updates status information, or adds other data (e.g., notes, documents, and photos), this information can be viewed upstream to provide a consolidated view to a respective requestor group appropriate to their level in the chain. Information may also be kept private and not be visible up the hierarchy. Members can be allocated/assigned to activity requests in several ways, such as: (i) Manual allocation: The user performing allocation makes a manual selection. (ii) Pre-assigned: Responder is pre-assigned based on contract and assigned site. (iii) Recommendation—Job Count at Site: A sorted list based on job counts in the region or at a site. (iv) Recommendation—Multi-Factor. A sorted list based on multiple factors such as proximity, price, community rating, trade, etc. (v) Keyword: The required skills are assessed from the description of the requested job and used to determine the primary trade and most suitable responders. It will be appreciated that the INCLOOD™ system is designed to support a multitude of such request chains or supply chain task and data requests occurring in parallel for all of the members or groups of the system.

Bi-directional relationships: All groups in the INCLOOD network can form mutual relationships with any other group. A group may operate as both a customer (requestor) and a provider (responder). Potentially, two organisations/groups could be in both a requestor and responder relationship with each other. A tyre company (often a responder) might request the services of an equipment service company to maintain their equipment. In that case, the tyre company is the customer (requestor), and the equipment service company is the service provider (responder), However, the equipment service company may also request the tyre company to supply tyres to their fleet of service vehicles. In that case, the roles are reversed—i.e., the equipment service company is the requestor and the tyre company is the responder. The INCLOOD™ platform can readily handle these bi-directional relationships from a process flow and finance perspective. The arrangement facilitates the real-time consolidated view of all activity associated with a request in a way that is simply not possible when task management is performed in separate systems or communicated via email or telephone call. Responders issuing invoices submit them to their requestor, who can then apply margin and forward as their own invoice to the next requestor back up the request/supply chain. All tasks within the request/supply chain can be referenced by the same unique reference number from the original requestor, as well as other IDs that are generated for the allocation of tasks down through the request/supply chain.

Multi-Lateral Relationship Management: In traditional business systems, a setting or data relating to an organisation (group) or person (member) will be recorded solely from the perspective of the host organisation. By contrast, in the INCLOOD™ ecosystem, settings, ratings, and other data need apply to the mutual relationship only. For example, invoice payment terms are contracted between a buyer (requestor) and seller (responder) pair. A single organisation/group within the INCLOOD™ system may have a range of different payment term arrangements for use with multiple other organisations/groups. The data structures to hold such settings must hold references to both parties/groups. The actual categorisation of the setting utilises the global IMS structure (group/category/item) to identify it.

Activity Management: Actual activities exist at the user level and are assigned to a particular job. Each activity possesses activity type, date, start time and end time values. Activity types are related to IMS Items. The costs of an activity are tracked against the job for work-in-progress (WIP) and billing purposes. Internal 'non-chargeable' activities can also be accumulated on designated 'internal' jobs that do not get invoiced to a customer. On starting the task, the start time is adjusted to the current time. The end time and duration are calculated on completing the task. Activities can also be marked as placeholder tasks for planning purposes to block out time. Incomplete activities can be shifted to the following business day, so they are not lost.

The INCLOOD™ system has an object type known as "Routine" which is a repository for all the data and configuration around the creation and management of recurring activities linked to any object type. The routine can be linked to other object types to facilitate a variety of recurring scenarios, including e.g., routine maintenance of asset items, linked to checklists, assets, locations, responders, jobs; periodic HR reviews; recurring meetings; recurring audits; recurring billing and payment cycles; recurring insurance and license renewals; recurring reminders for outstanding documents, invoices etc.; customer relations management (CRM) follow-up and customer care activities; and scheduling for Continuous Improvement System (CIS) reviews.

The "Routine" system or module is an integral part of the INCLOOD™ system's activity management/organiser capability. This includes sharing an "organiser"/calendar function across the network of users. In this way, calendars can be shared selectively according to user preference. Sharing of calendars between groups and members of the system provides for network-wide calendaring functions, such as booking processes, and the setting of availability windows for acceptance of requests and contact. Network-wide sharing also facilitates the negotiation of agreed dates and timeframes for scheduling using voting and other techniques. Scheduled activities can be viewed in several different ways: Calendar, List, Gant Chart and Schedule view (resource v time calendar). The same activity information can be viewed in any of these tools to provide the user with the greatest insight into how activities interact (gaps, overlaps etc.).

The calendar objects of the INCLOOD™ system provide users with the ability to view the calendars of multiple user profiles and multiple members at one time. For example, if a user has multiple profiles (i.e., is a member of multiple groups) then they can switch between profiles and view the calendars of the associated members for each profile. It is also possible to view all profiles at once. If a member has multiple profiles, then activities from each of the profiles can be displayed on the calendar either one profile at a time, or from a selected set of profiles. This enables all a member's scheduled activities to be viewed at one time. The calendar for an individual member can be viewed in day, week, or month mode. In a calendar "Multiview" mode, the day schedule for multiple members can be viewed at one time—each member being a column in the calendar. The user may add and remove members to this view from a checkbox list of available members. A view will also be available to view week and month schedules of individual members side-by-side. The user can scroll left-to-right to view the individual calendars. Calendar access can be granted by a member outside the user's group via an access request process. Calendar items can be dragged to a different date and time if not in progress or complete. Calendar items can be started, paused, and completed. An individual user can only have a single in-progress item at one time. A calendar item is always related to a person, a job (billable or non-billable) and a location. When a task is paused, the original task is marked as complete, and a duplicate task is crated to be resumed later. Calendar items are rendered in different colours to communicate status of the item to the user. Members can also block out dates and times when they are unavailable. At a group level, this can also be done using the "Unallocated" member that is present in each group. This information assists in the allocation process.

A user can create a calendar item by clicking on the calendar. This will display a form to allow them to perform, for example, any one or more of: (i) choose an Internal Job or actual job. Internal jobs are for non-billable tasks (e.g., unpaid breaks, leave, internal meetings, admin work etc.). Groups can create their own internal jobs; (ii) select IMS activity type; (iii) select CIS (optional); (iv) enter task description; (v) select date and time; (vi) enter duration; (vii) set flags such as "locked", "placeholder", "unavailable"; (viii) set recurring calendar item parameters; (ix) set location (optional); or (x) review billing rate for the item.

Workflow Execution Framework/Workflow Execution Module: Generic workflow allows a developer or business analyst to build workflow chains from discrete configurable generic workflow steps. Workflow actions are typically initiated by events such as saving new objects, approving, declining and so on. Many workflows contain similar steps such as performing permission checks, adding notes, and sending emails. To maximise the maintainability and reusability of individual steps, a database-driven technique has been developed to hold the configuration of each workflow with its steps. Workflow step names follow a strict naming convention that links each step to a specific class in the codebase that contains the logic for that workflow step. It is also possible to specify a custom class name. Workflow steps are linked together by their IDs and are ordered to form a particular workflow that will execute the steps in the prescribed order.

Member Role & Permission Framework/Member Role & Permission Module: The INCLOOD™ system implements a role-based permission structure for members that controls functional access, data visibility, authorization, and the notification of system data and events. Roles are assigned within a group relationship at a task-item level—e.g., designating who may authorise a site job request, who may authorise an invoice payment, or the like. Members with designated roles will have access to data and system functions according to their role. For example, a member in an "Inform" role will be informed—i.e. will have access to data, notifications, etc. but will have no ability to perform actions on the respective object. This provides feature security as any given user or member must have the ability to perform any particular function. e.g., Can they approve a quote, can they allocate a job, can they run a report etc. A user's ability to perform a certain function is stored in the role-based permission structure.

Best practice for managing tasks and responsibilities in an enterprise will typically involve implementation of a roles and responsibility matrix—commonly known as RACI, in which people associated with a task are assigned to specific roles: R=Responsible, A=Accountable, C=Consulted, and I—Informed. This approach has been extended in the INCLOOD™ system to provide additional capability that is needed in a networked system across multiple organisations. This matrix to handle user permissions and authority levels within the INCLOOD™ system has become iRVRAAUCI—which stands for the following terms as set out in Table 4 below:

TABLE 4

Roles and responsibility matrix.

| Legend | Letter | Role | Description |
|---|---|---|---|
| ● People<br>➧Activity<br>■ Object<br>IRVRAAUCI Relationship | iR | Inclood Relationship | Object Relationship |
| Visibility | V | Visible | The user has visibility of the object |
| Responsible | R | Responsible | The user who will perform the task |
| Accountable | A | Accountable | The person accountable for the completion of the task. |
| Authorised | AU | Authority | Has the authority to approve an action to a certain level |
| Consulted | C | Consult | Consulted in decision making process |
| Informed | I | Informed | Informed |

This allows users to be defined by role with the ability to perform approval tasks according to their authority level. The iRVRAAUCI setup also automates notification of key events to the interested parties (members) defined by the iRVRAAUCI rules. Member permissions also cover the visibility of data, as set out in the examples of Table 5 below:

TABLE 5

Examples of roles and permissions.

| Letter | Function | Requestor | Intermediary | Responder |
|---|---|---|---|---|
| iR | Activity, Member or Sharing Request | Relationship formed by initiation of a request | Request acceptance &Request initiation | Request acceptance |
| V | View enabled by establishment of relationship | Search and View but no Change ability | Search and View but no Change ability | Search and View but no Change ability |
| R | Configured by role and Activity/Item | Request responder | - Request responder | Calendar item |
| A | Configured by role and Activity/Item | Requestor CIS interested party | | |
| AU | Authorise | Approve Inbox Item | Approve Inbox Item | |
| C | Seek Advice | Note or email | Forward email, share notes | Note |
| I | View only data + notifications | Search and View but no Change ability + notifications | Search and View but no Change ability + notifications | Search and View but no Change ability + notifications |

Workflow controls are provided using an approval system. Approvals provide hold points to manage business and data risks and relate to:

- Internal Requests; e.g., a manager may approve a job request logged by a site before it proceeds to be allocated to a provider.
- Business transactions; e.g., acceptance of quotes, payment of invoices, approval of time entries for billing and payroll purposes.
- Acceptance of data or files e.g., uploaded documents and images, or new IMS data entries
- Approval or decline of access requests.
- Approval of a job extension or variation request.

Items requiring approval will arrive in an approver's INCLOOD™ inbox by virtue of them being designated as an approval authority according to the iRVRAAUCI rules. An approver may have an approval limit applied to them (e.g., a maximum invoice or quote value). Approval limit rules will be required (e.g., approve up to $5000 allowed, approve over $5000 requires additional approval). It is also possible to set multiple approval levels. For example, an organisation may require an invoice to be approved by an operational manager and then by a finance manager. In addition, an approver can have a limit to their approval authority such as a maximum invoice value. In a multi-level approval situation, a change request is not completed until all approvals have been completed. The required and current level of approval are fields available on the object card enabling a user to determine what approval level the object is currently at.

The INCLOOD™ iRVRAAUCI permission structure will determine the correct destination of approval requests within a group based on evaluation of the request and the configured rules. For an item to be fully approved, all approvers must perform their approval. For each approval action, a row is added to an approval table. This allows an unlimited number of rows to be created for each entity record. Organisations or groups can set up multiple approval 'schemas' that will designate who can approve what to what level. The use of a schema provides a way to manage who can perform certain approvals by adding them as members within the schema. Members can be added and removed from the schema independently of their primary role. All approval and decline actions are logged to provide an audit trail of these actions. It is possible to configure a checklist that assists the approval process by providing the criteria that are to be considered in the approval action. The approver performs a rating of each checklist item, and the result of the ratings determine the approval outcome. In this way, the factors determining an approval or decline decision are also logged to provide an audit history, objectivity, and transparency. Successful approvals can initiate certain actions such as the change of job status or other object status. Approvals and declines will generate notifications according to notification rules for the interested parties. As requests are created and approval/decline actions are performed, members are notified according the iRVRAAUCI rules configured for the item to advise them of the progress of the item, or an action they need to perform. Members can set their own notification preferences, specifying: How notifications are to be received (e.g., email/inbox/SMS) and notification frequency (e.g., each notification or at specified intervals). The INCLOOD™ system has a notification engine that issues notifications as events occur according to the configured rules and notification preferences.

Data Exchange: The INCLOOD™ system provides interfaces to integrate with a range of different data sources, including business systems (e.g., accounting systems, Asset management systems, CRM systems), document management systems (e.g., Microsoft SharePoint), email, calendar systems (e.g., Microsoft 365, Google Calendar, Apple Calendar), voice (softphone integration), and video (recorded web-meetings, softphone). The INCLOOD™ system data exchange can operate in multiple modes:

TABLE 6

Mode of data exchange.

| Mode | Description |
|---|---|
| Bi-directional data exchange | Communicates structured data such as business transactions (e.g., Orders and invoices) between Inclood and the external system |
| Inbound data only | The INCLOOD ™ system will receive data from an external system and store it and act on it (emailed work order, or uploaded content such as documents and images) |

TABLE 6-continued

| Mode of data exchange. | |
|---|---|
| Mode | Description |
| Outbound data only | The INCLOOD ™ system will communicate to external systems in an outbound direction only (e.g., email or SMS notifications). |
| Pass-through mode | In Pass-through mode the INCLOOD ™ system integration engine receives data from one external system and transforms it to post to another external system. |

An example of a request chain or a supply-chain is illustrated in FIG. 6 and FIG. 7 of the drawings. In such a supply-chain, it is common practice for a requestor to require certain documentation of completion from a responder, such as before and after photos, hazard prompt sheets, or other Checklists or documentation. Often invoices will not be paid without the proper documentation, so the ability to track documentation of completion is very important. For a multi-level supply chain that the INCLOOD™ system enables, these requirements must be managed down and up the chain and provide the ability for a party to add their own requirements at any level in the chain. The end responder will therefore have an aggregated set of requirements to be fulfilled to satisfy their immediate requestor. An intermediate requestor will only need to supply the documentation required from the level above and so on. At each level, the requestor will review and approve or reject the documentation supplied. If rejected, the responder must then amend and resubmit. If approved, the documentation can be forwarded up the chain. An appeal process may also be provided at any level to a rejection. If the appeal fails, then the supplied document is rejected further down the chain also. An automated reminder system may be employed to send reminders (e.g., by email and/or reminder prompts in the INCLOOD™ system App) to responders for any outstanding documentation.

Each requirement is handled in the same way, as entry into the tracking table, specifying the Job, Activity Request and Document Type. These entries are made at the point of allocation to the responder. There are three categories to consider: 1. Copy any upstream requirements so far. 2. Add own Standard Requirements from saved rules. 3. Add own requirements specific to the job request. The diagram in FIG. 6 shows how the Job requests (J), Activity Requests (PO) and document requests (D) are stored to perform this tracking. At PO1, Supplier 1 accepts the request for the job J1 from the Client (i.e. customer) and then allocates it, or a part of job J1, as a new job J2 to Supplier 2, acting as subcontractor. At PO2, Supplier 2 accepts the request for the job J2 from Supplier 1 and then allocates it, or a part of job J2, as a new job J3 to Supplier 3, as another sub-contractor. At PO3, Supplier 3 accepts the request for the job J3 from Supplier 2 and then allocates it as a new job J4 to the Mobile Tech, who receives the job or task J4 for completion. In multi-level network chains, targets set at the start of the chain are propagated to each level, potentially with a buffer value. For example, the Client may set a job completion date to be in seven days' time. An intermediary, e.g., Supplier 2, may allocate the job to Supplier 3 with a two-day buffer which means Supplier 2 has a due date in five days' time. If Supplier 3 is unable to complete the job within the five-day target, then Supplier 3 will need a change request to extend the due date. If Supplier 3 requests one or two days of extra time from Supplier 2, the revised completion date still falls within the seven-day target Supplier 1 is working to, so Supplier 2 can approve that change request without impacting its own delivery performance. However, if Supplier 3 requests a four-day extension to complete the job, then the buffer set by the Supplier 2 is exceeded and Supplier 2 must also request an extension from Supplier 1, who in turn, must request an extension from the Client. This knock-on request upstream is handled by the Request Forwarding process. The Request Forwarding process creates a copy of the downstream request and forwards it to the Client for approval. If the Client approves, the due dates are changed according to the forwarded change request. Supplier1 now has an approved extension request and is in a position to grant the original change request to Supplier 2, who, in turn, may approve the request from Supplier 3.

Figure 8:
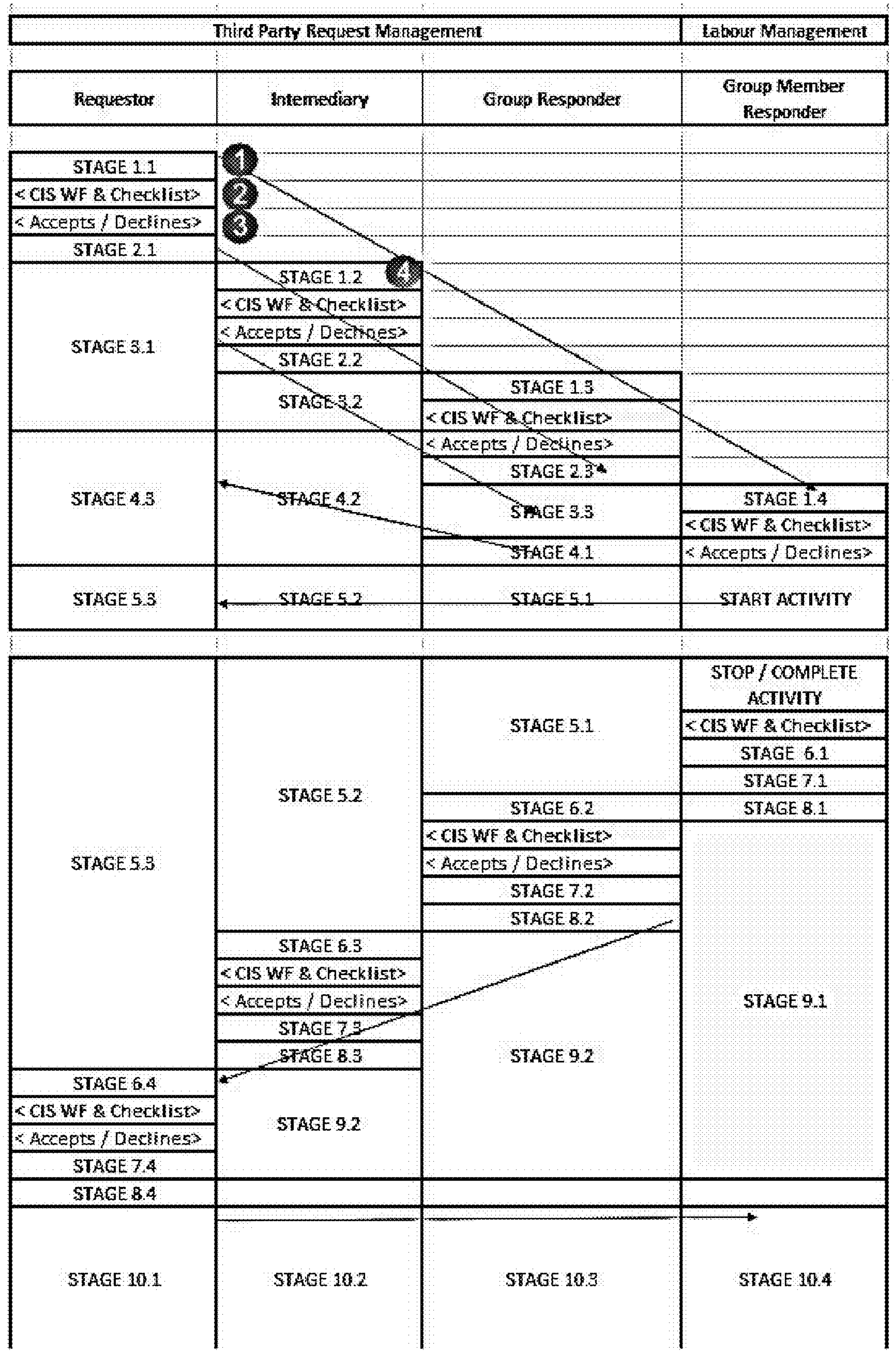
FIG. 8 is a schematic representation of a cascading stage change graph in a more detailed example of a request chain/supply chain in the INCLOOD™ system.
Figure 9:
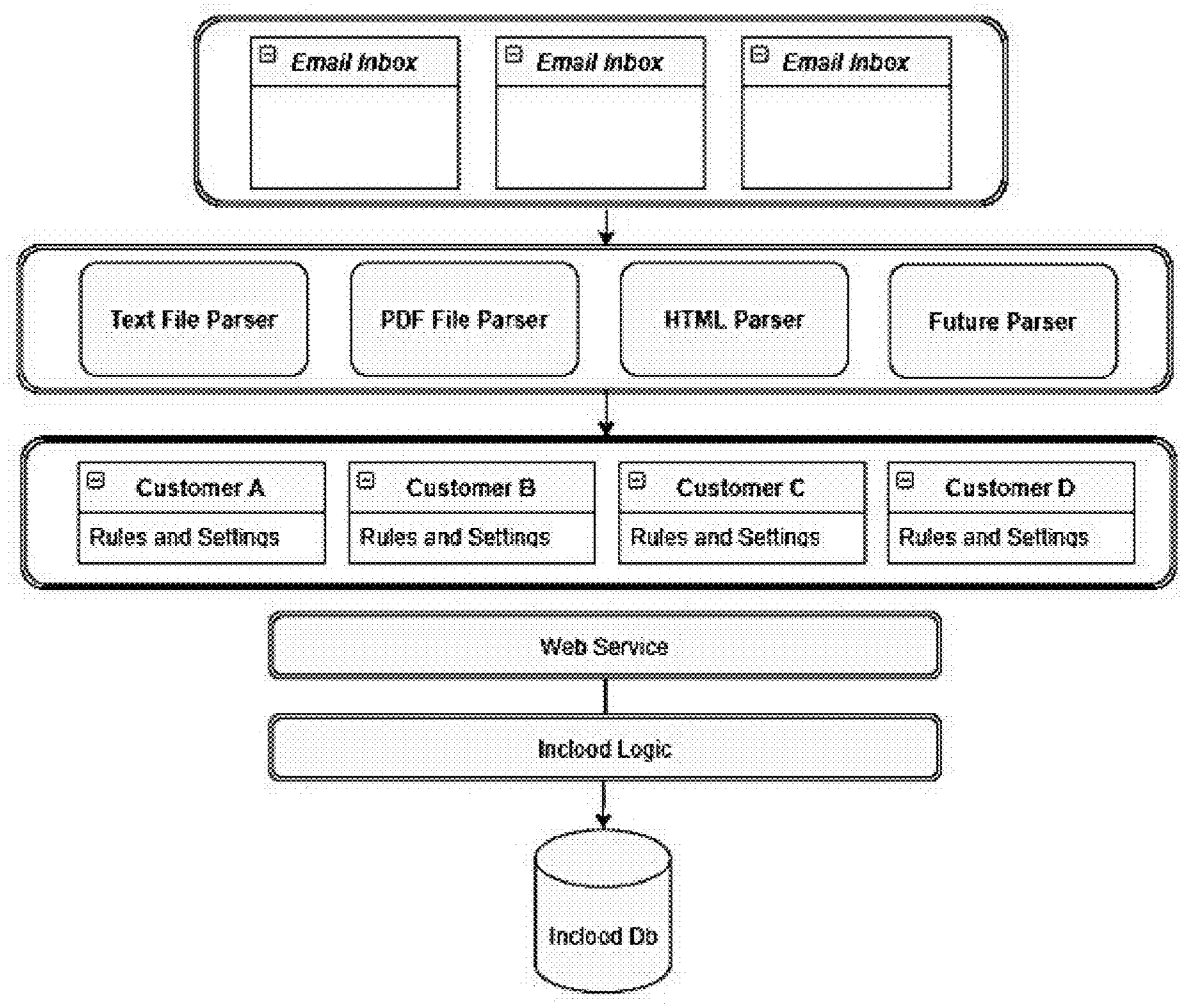
FIG. 9 is a schematic diagram illustrating email and data exchange in the system described.

Referring to FIG. 8 of the drawings, a cascading stage-change graph is illustrated showing the stages of a request chain or supply chain in the INCLOOD™ system. The Requestor is the initiator of the request (e.g., customer). The Intermediary receives the request and manages delivery of the request (e.g., a service desk or broker) and then allocates the request to third parties. The Responder Group (e.g., a supplier or contractor) receives request from the Intermediary to perform the task. The Responder Member is then an individual working in the Responder Group who performs the actual task. At reference numeral 1, the Workflow Stage is presented in a <stage> and <network level> format. Stage 1 (i.e., the initial stage) will propagate down through each network level as Stages 1.1, 1.2, 1.3, etc. At reference numeral 2, prior to a stage change, a Continuous Improvement System (CIS) management process supervises the transition to the next stage. A checklist that specifies the necessary standards must be completed successfully at part of this process. At reference numeral 3, a user/member defined by the iRVRAAUCI rules of the group for this particular stage change must approve or decline this stage request in conjunction with the checklist results. It is possible that this user can be defined to be "INCLOOD-bot" which automatically performs the approval or decline action without the need for a human interaction. At reference numeral 4, on acceptance of an upstream stage change request, the downstream change is updated automatically.

TABLE 7

| Examples of Cascading Stage-Change Processes | | |
|---|---|---|
| Type | Process | Description |
| Job | Job Allocation and status updates | Allocation of job through a supply chain |
| Job | Job Cancellation | Cancellation of a job propagating down the network to ignore the original request. |
| Job | Job Hold | Job placed on Hold propagating down to pause work. |

TABLE 7-continued

Examples of Cascading Stage-Change Processes

| Type | Process | Description |
|---|---|---|
| Job | Job Completion | Job completion notification propagating up. |
| Job | Job Extension Request | Request to extend the completion due date propagating up. |
| Job | Job Variation Request | Request to increase the agreed cost limit propagating up. |
| Job | Document or Report submission | Responder document or report submission reviewed and passed on up to the requestor. |
| Quote | Quote request and submission | Quote request sent through supply change for multiple estimates that can be combined into a quote submission back to the requestor. |
| Quote | Quote Approval/Decline | Approval of a submitted quote propagating down. |
| Invoice | Invoice submission | Invoice submitted by responder propagating costs up. |
| Invoice | Invoice approval/decline | Invoice approval by requestor propagating down. |
| Asset | Data collection or report | Asset data collection or condition report information propagating up. |

In practice, requests and responses will not happen instantly, and there maybe delays or lags of days or even weeks between requests and responses. INCLOOD™ provides tools to effectively manage requests and responses. The INCLOOD™ system provides a range of tools to facilitate the request chains. The iRVRAAUCI rules route requests to designated reviewers. The rules are configured to route requests to the users who have authority to act on them according to their role. e.g., invoice approval requests only visible to a finance role users. The tools include auto-approval of requests. In this regard, some stage-change requests can be assessed automatically and processed by the system using the "INCLOOD-bot" stage-change processor. Filterable grids enable objects to be filtered by stage to reveal a consolidated list of objects to be managed (e.g., jobs on hold, quotes to be approved, etc.). Summary grids provide a high-level snapshot of how workflow is distributed among the various stages. This helps managers identify bottle-necks and investigate them.

Email Integration (MAPI): A member can enter the details of their email account into INCLOOD™ to enable emails to be fetched by an Inclood server process and appear in the user's INCLOOD™ box. Currently the MAPI mail protocol has been implemented. Inclood does not store the user's emails but fetches them from the email server on demand. A member may set up multiple email accounts to view in the INCLOOD™ system. Other email functions supported by the INCLOOD™ system are:

Compose email

Reply to email

Forward email

View and upload file attachments from inbound emails

Attach files to emails

Manage email priority flags

Manage email category flags.

This allows a user to manage all their electronic communications from within the INCLOOD™ system. Further integration may include a native connection to Microsoft 365 using GraphQL. Table 7 lists the email integration protocols the INCLOOD™ system.

TABLE 8

Email Integration (MAPI) Protocols

| Third-party provider | Communication Technique |
|---|---|
| Google Gmail | MAPI Protocol |
| Microsoft 365 | MAPI Protocol |
| Other | MAPI Protocol |

Rules can be set up within the INCLOOD™ system to store emails automatically based on the sender, the subject line, etc. Stored emails will appear as notes in the communication section of an object card.

INCLOOD™ Mail Connect: The INCLOOD™ Mail Connect shown schematically in drawing FIG. 6 is a server-based application that can monitor one or more email servers and that processes inbound emails looking for work order requests which are then created as jobs in the INCLOOD™ system. This application is designed in software layers to provide flexibility and future extensibility.

TABLE 9

Email Parsing Functions

| Layer | Function | Details | Future |
|---|---|---|---|
| Email inbox | Connects to multiple email inboxes. | Supports Exchange Web Service (EWS). | Microsoft GraphQL MAPI |
| Parser | Parse content of email and attachments to extract keywords, data and identify source customer | Text file, HTML, and PDF File parsers | Office documents - Word, Excel |

TABLE 9-continued

| Email Parsing Functions | | | |
|---|---|---|---|
| Layer | Function | Details | Future |
| Customer Rules | Parsed content given to Customer rule class | Separate classes implemented for each customer workorder type. | Additional workorder formats |
| Action | Create workorder in Inclood or update email subject | If email is determined to be a workorder, create order in Inclood via web service call. If not a workorder, update email subject line to prevent reprocessing | |

The parser searches text, HTML or PDF content to extract keywords and adjacent text values. In the case of the PDF parser, coordinates from the customer rule sets are also used to more precisely search for specific field values based on the known structure of a work order document.

The source email from address and subject line can be used to identify known customers. Each customer work order has a separate set of rules which are used to process the parsed content and form a work order request. These customer rules will also be able to determine if the email is not in fact a workorder. In this case, the email subject line is updated to prevent unnecessary re-processing. Once work order details are known, a web service call is sent to the INCLOOD™ system with the parameters to create a new job in the system.

Continuous Improvement System (CIS) Framework or Module: The INCLOOD™ system has an integrated continuous improvement (CIS) framework or module that makes it possible to log and track continuous improvement items-which could be problem areas such as defects and failed ratings or opportunity items such as future requirements or feature requests. The CIS process utilises best practise ISO continuous improvement workflows. The CIS can hold references to any object type and be related to groups and multiple members. When first created an initial rating can be made, and continuous improvement actions created. The CIS is also used to control key processes such as an object stage change within the system. An object stage change will pass through an automated CIS cycle to provide structure, guidance, and audit logging for the stage change. Object stage changes are significant events that may have significant commercial impact and so are handled carefully in this way. The CIS also holds information about who is involved and should be notified during the life cycle of the event, as well as records of relevant ratings and other evaluations made at the time. The Continuous Improvement System (CIS) framework allows CIS Items to be assigned to multiple system objects (such as jobs and assets) to monitor and action specific events or work items. The CIS item is categorised from IMS group, category and item data and can be used to handle an investigation, assign corrective and preventative activities, and schedule a review process. Ongoing risk or opportunity items can be revisited when set up as preventative actions. At each point of review, the original item can be re-rated and ongoing risk evaluated.

Integrated Management System (IMS) Framework or Module: The IMS is a three-level linked categorisation system that provide a master framework for categorising and segmenting object data of all types. This approach provides a common way to describe object data at a high level which is essential in the shared network environment to be able to facilitate communication between groups, provide common reporting categories, and facilitate optimisation tools that rely on a consistent taxonomy of data. The master data is maintained centrally by the INCLOOD™ system administrators and is available to all community members. Individual groups can create their own additional categorisations using this structure. There is a review process that will periodically review community additions to the master data that will promote community generated values to the master shared data set. This framework is common to all object types and can be found in the Manage category. The 3 levels are: Type (highest level), Category (intermediate level), and Item (lowest level).

The item can also have a parent item. Objects themselves can also have parent objects (or the same type) such as job>sub-job, company>subsidiary, asset>parts. There is a global tool to assign or reassign a parent object. Each object type has group, category, and item fields to categorise the record. For example, an asset may have a categorisation of: Type=Appliance, Category=Kitchen (Commercial), Item=Benchtop warmer. The same categorisation can be applied to Activities, e.g.: Type=Operations, Category=Service & Coordination, Item=Customer Enquiry & Request. There are separate individual master lists for group, category, and item. Unique combinations of the group, category and item are combined into a master record and linked to an IMS type (asset, task etc). From this master item, additional data can be configured in extension tables.

Within the "Activity Management" of the INCLOOD™ system, calendar entries, such as attendance or completion dates, can be assigned time buffers that will calculate earlier internal dates to cope with unforeseen events to maximize the change of on-time attendance and completion. Jobs can be assigned a priority code which calculates the completion due date based on configured offsets. Buffers can also be set for these calculations. A master priority list governs community priority values, but groups can set their own priority codes and buffers as well. Priority codes relate to any request type to set the parameters of the response (job, quote, CIS etc.).

Advantages and Industrial Applicability

As explained above, the embodiments of the INCLOOD™ system provide the advantage of standardised approaches to both the organization of data and the exchange of data between parties. In the INCLOOD™ system, information is handled as objects which can be linked to one or more other objects in a consistent way. Objects can be linked to external systems through integration processes and may hold references to the data record in the external system.

Thus, the INCLOOD™ system can operate as a data exchange between external systems using the object structure as a common intermediate data layer. The INCLOOD™ system provides tools and interfaces to allow organisations and people to communicate through a variety of means and share transactional data, communication data and electronic files (e.g., documents and images). The INCLOOD™ system provides a standardised toolset within a networked computing infrastructure to simplify the organisation and exchange of all kinds of information. As such, the system clearly has industrial applicability. In addressing the problems of managing workflow between multiple parties in a supply chain of unlimited depth, the INCLOOD™ system implements several key elements including providing the ability to set benchmarks for activities, performance, and conditions, comparing against actual in-process values and calculating score that can be used to make decisions and create an audit trail. Examples of commercial applications for the system of this disclosure are set out below:

Human Resources (HR)—Keeping personal profiles, resumes, sharing these for recruitment purposes, allowing to keep a group/member record of all certifications, training, personal details, undertaking reviews of performance training and competencies, rating against IMS activities, and retaining personal files with group info to be transferable to other groups as aggregated history.

- Maintain checklists, reports, records of location, condition, safety, compliance and suitability of work environment.
- Planning and recording working times, when working or not, sharing calendars for availability, booking suggestions. Updating of time per period for contract agreement verification and payroll/contract payments, verification for interested parties, insurance, work cover, payroll etc.
- Maintaining digital checklists for work activity, routine hazard prompts, and day to day activity lists.
- Reporting an incident or near miss, sharing with work and other interested parties such as insurer and work cover, investigator and health professionals.
- Maintaining cis records for a back to work plan, corrective and preventative actions, recording rating of progress.

Customer Relations Management (CRM)—Maintaining records of conversations, establishing routines for follow up reminder process, and sharing calender with possible booking times to multiple interested parties and acceptance by way of general consensus of selected preference for meet invites.

E-Commerce and Delivery/Pick-Up Workflow—Digital forms and stock, apply forms, stock, ratings, calendar, and sharing in medical industry, digital prescription forms carrying stock items with quantities and instructions, between doctor and patient and supply and interested parties. Ability to search best dispensing option by rating (distance stock availability, distance, price, service rating etc) allocate order/click and collect or delivery service (allocate request for pick up from dispenser and delivery to home), instant request into dispensers system or use inclood interphase or both for action of prescription, calculate stock and replenish orders directly to manufacturer/supplier, submit invoice as required, patient, Medicare, private cover, or other, and processing payments through network, update interested parties with records (insurance, work, family & friends, doctor, helpers etc.).

Asset Management—Routine calendar, sharing calendars, asset documentation, warranty and checklist information, contracts, history, ratings, reports, and certifications between asset owner, contractor/subcontractor network, manufacturer, installer and interested parties such as authority, insurer and/or certifier.

Variations and Modifications

Although specific embodiments of the invention are illustrated and described herein, it will be appreciated by persons of ordinary skill in the art that a variety of alternative and/or equivalent implementations exist. It should be appreciated that each exemplary embodiment is an example only and is not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that, unless the context requires otherwise, the terms “comprise”, “comprising”, “include”, “including”, “contain”, “containing”, “have”, “having”, and any variations thereof, used in this document are intended to be understood in an inclusive (i.e. non-exclusive) sense, such that the process, method, device, apparatus, or system described herein is not limited to the features, integers, parts, elements, or steps recited but may include other features, integers, parts, elements, or steps not expressly listed and/or inherent to such process, method, device, apparatus, or system. Further, the terms “a” and “an” used herein are intended to be understood as meaning one or more unless explicitly stated otherwise. Moreover, the terms “first”, “second”, “third”, etc. are used merely as labels, and are not intended to impose numerical requirements on or to establish a certain ranking of importance of their objects. In addition, any reference to positional terms, such as “lower” and “upper”, used in the above description are to be taken in context of the embodiments depicted in the figures, and are not to be taken as limiting the invention to the literal interpretation of the term but rather as would be understood by the skilled addressee in the appropriate context.

Although not required, embodiments may potentially be implemented via an application programming interface (API), or via an application development kit (ADK) or as a series of libraries, for use by a developer, for the creation of software applications which are to be used on any one or more computing platforms or devices, such as a terminal or personal computer operating system or a portable computing device, such as a smartphone or a tablet computing system operating system, or within a larger server structure, such as a ‘data farm’ or within a larger transaction processing system.

Generally, as program modules include routines, programs, objects, components and data files that perform or assist in the performance of particular functions, it will be understood that the functionality of the software application may be distributed across a number of routines, programs, objects or components to achieve the same functionality as the embodiment and broader concept described and claimed herein. Such variations and modifications are within the purview of persons skilled in the art.

It will also be appreciated that where methods and systems of this disclosure and/or embodiments are implemented by computing systems or partly implemented by computing systems then any appropriate computing system architecture may be utilised. This includes standalone computers, network computers and dedicated computing devices (such as field-programmable gate arrays). Where the terms "computer", "computing system", "computing infrastructure" and "computing device" are used in the specification, these terms are intended to cover any appropriate arrangement of computer hardware for implementing the concepts and/or the embodiments described herein.

Particular embodiments may include one or more computer-readable storage media implementing any suitable storage. In particular embodiments, a computer-readable storage medium implements one or more portions of the processor, one or more portions of the system memory, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in Hyper Text Markup Language (HTML), Extensible Markup Language (XML), or other suitable markup language.

The invention claimed is:

1. An electronic data exchange configured as an electronic platform for a network of independent platform users, the platform designed for managing commercial activities between the users, comprising:

networked computing infrastructure, including at least one server or processor and a database for storing user data in user accounts for access by respective users, wherein the networked computing infrastructure is configured to control communication between users via respective user computing devices, wherein the networked computing infrastructure is configured to receive from any user, and to transmit to any user, request or response data relating to one or more objects subject to an activity or relating to one or more activities to be carried out in respect of the object(s) between the users via the platform; and a workflow execution module operated by the server or processor that manages a request and response workflow process in respect of the one or more activities to be carried out between the users in a request chain, wherein the workflow execution module provides a series of linked or cross-referenced process stages of the workflow process in respect of the request chain to monitor and coordinate fulfilment of each process stage of the request chain, wherein the series of linked or cross-referenced process stages of the workflow process passes or cascades between a plurality of levels of the users on a responder side of the request chain.

2. An electronic platform according to claim 1, wherein the workflow execution module is configured for data entry by each of the platform users connected or related in the request chain regarding completion or approval of a process stage of the workflow process at a particular level with which that user is associated.

3. An electronic platform according to claim 2, wherein, upon completion or approval of a process stage of the workflow process at a particular level, the workflow execution module is adapted to update the process stages of the request chain and to inform a next one of the users in the request chain automatically.

4. An electronic platform according to claim 1, wherein each of the users can act as a requestor or a responder in a request and response workflow process, wherein the users form a network of requestors and responders in the request chain, such that the platform is an electronic exchange for supply chain management.

5. An electronic platform according to claim 1, wherein the users are collected in groups, the groups corresponding to organizations with which the grouped users are associated; wherein each group can act as a requestor or a responder, wherein the groups form a network of requestors and responders in a request chain, and wherein the platform is an electronic exchange for customer and supply chain management.

6. An electronic platform according to claim 1, wherein the workflow execution module is configured to provide the workflow process to users in the form of one or more checklist to give users relevant decision-making factors, wherein the platform is configured to record user responses to the workflow process to create a log of member decision-making.

7. An electronic data exchange configured as an electronic platform for a network of independent platform users, the platform designed for managing commercial activities between the users, comprising:

networked computing infrastructure, comprising one or more processors or servers and a database storing user data in user accounts for access by respective users, wherein the networked computing infrastructure is configured to control communication between users via respective user computing devices, wherein the networked computing infrastructure is configured to receive from any user, and to transmit to any user, request or response data relating to one or more objects to be subject to an activity or relating to one or more activities to be carried out in respect of the object(s) between the users of the platform;

an object module operated by the one or more processors or servers and configured to identify and classify automatically an object nominated by a member to be subject to an activity via the system, wherein the object module is configured to classify the object nominated by a member in at least one category, including one or more of: relationship to a user, document, communication, physical item, activity, calendar item, request, and financial transaction, and wherein each category includes sub-categories that define one or more of: (i)

a target status, being a benchmark status for the object; (ii) an active status, being a current status of the object; and (iii) a score, being a comparison of the active status with the target status; and a workflow execution module operated by the one or more processors or servers that provides a workflow process to users for the one or more activities to be carried out in respect of the object(s) between the users of the platform.

8. An electronic platform according to claim 7, wherein the one or more object is an item of information selected from the group consisting of: a member, a job order, a quote, an estimate, an information request, a proposal request, an activity request, a document, an address, a note, a diary, an Integrated Management System (IMS) item, a Continuous Improvement System (CIS) item, an asset, an invoice, a payment, a budget, a purchase order, an adjustment, and an account.

9. An electronic platform according to claim 7, wherein the object module is adapted to enable relationships to be created between objects of different types and made available to authorised users in the network, wherein a selection tool is adapted to enable a user to search and select objects to be linked to another object, wherein selection creates an object-linking relationship, wherein a control table determines object types that can be linked; and/or wherein a user may optionally “share” an object with other users.

10. An electronic platform according to claim 1, wherein the user computing devices are remote from the networked computing infrastructure and comprise any one or more of a desktop computer, a laptop computer, a tablet device, and a mobile smartphone, wherein the networked computing infrastructure is adapted to communicate with the user computing devices via the Internet and/or via a mobile telecommunications network.

11. An electronic system for managing commercial activities between members of a network of independent system users, the system comprising:

networked computing infrastructure, including at least one server or processor and a database for storing member data in member accounts for access by respective members, the networked computing infrastructure being configured to enable or control communication between members via respective member computing devices, wherein the networked computing infrastructure is configured to receive from any member, and/or to transmit to any member, request or response data, e.g., relating to one or more objects to be subject to an activity via the system and/or relating to one or more activities to be carried out in respect of an object in the system;

a workflow execution framework or workflow execution module operated by the server or processor that manages a request and response process in respect of the one or more activities to be carried out between the members; and a member role and permission framework or member role and permission module to control or regulate functional access, data visibility, and/or notification of data and events in the system, wherein the member role and permission framework or module is adapted to assign or designate roles and permissions to members at an activity level, whereby members having a designated role are granted access to data and functions in the system according to their role.

12. An electronic system according to claim 11, wherein each of the members can act as a requestor (e.g., customer) or a responder (e.g., provider of products and/or services) in a request and response process, wherein the members form a network of requestors and responders in a request chain or supply chain for products and/or services, whereby the system forms an electronic exchange for supply chain management.

13. An electronic system according to claim 11, wherein the members are collected in groups, the groups corresponding to organizations (e.g., companies) with which the grouped members are associated; wherein each group may act as a requestor (e.g., customer) or a responder (e.g., provider of products and/or services), wherein the groups form a network of requestors and responders in a request chain or supply chain for products and/or services, wherein the system desirably forms an electronic exchange for customer and supply chain management.

14. An electronic system according to claim 11, wherein the workflow execution framework or workflow execution module is configured to provide linked or cross-referenced process stages of a workflow process to members or groups connected or related in respect of a specific request chain for monitoring and coordinating fulfilment of each process stage of the request chain.

15. An electronic system according to claim 14, wherein a series of the linked or cross-referenced process stages provided by the workflow execution framework or module passes or cascades between each of the members or groups connected or related in the specific request chain such that, upon completion or approval of a stage of the workflow process by one of the said members or groups, the next one of the said members or groups in the request chain is correspondingly informed and the process stages of the request chain are updated automatically.

16. An electronic system according to claim 11, wherein the workflow execution framework or workflow execution module is configured to provide a checklist of steps to members or groups in each request and response process to provide members or groups relevant decision-making factors, wherein the system is configured to record member or group replies or entries to the checklist to create a log of member decision-making.

17. An electronic system according to claim 11, further comprising an object framework or object module operated by the server or processor and configured to identify and classify automatically an object nominated by a member or group to be subject to an activity via the system, wherein the one or more object is an item of information selected from the group consisting of: a member, a job order, a quote, an estimate, an information request, a proposal request, an activity request, a document, an address, a note, a diary, an Integrated Management System (IMS) item, a Continuous Improvement System (CIS) item, an asset, an invoice, a payment, a budget, a purchase order, an adjustment, and an account.

18. An electronic system according to claim 17, wherein the object framework or object module is configured to identify and/or to classify an object nominated by a member in at least one category, including one or more of: relationship to a member, document, activity, calendar item, request, physical item, communication, and financial transaction.

19. An electronic system according to claim 18, wherein each category includes sub-categories that define one or more of: (i) a target status, being a benchmark status or value for the object; (ii) an active status, being a current status or value of the object; and (iii) a score, being a comparison of the active status with the target status.

20. An electronic system according to claim 17, wherein each object has a single identifier and can be linked in one or more relationships with any other object via the object framework or object module.

21. An electronic system according to claim 17, wherein object data is presented to the user in different modes, including a "new" mode configured for creating a new instance of the object (e.g., a new job, a new invoice, a new member, etc.) and a "change" mode for editing data associated with an object (e.g., a change in job cost or job completion date, etc.).

22. An electronic system according to claim 17, wherein the object framework or object module is adapted to enable objects to be linked in object collections or in object hierarchies, wherein a collection is owned at a group level, and wherein objects can be added or removed from a collection by a member, wherein collections can be used to manage objects at scale, and/or wherein a hierarchy can be created between objects by setting a parent of an individual object.

23. An electronic system according to claim 17, wherein the object framework or object module is adapted to enable relationships to be created between objects of different types and made available to authorised members in the network, wherein a selection tool is adapted to enable a member to search and select objects to be linked to another object, wherein selection creates an object-linking relationship, wherein a control table determines object types can be linked; and/or wherein a member may optionally "share" an object with members outside of an object ownership group to provide those outside members access to the object.

24. An electronic system according to claim 11, wherein the workflow execution framework or workflow execution module is configured to provide a workflow process to members automatically, in the form of one or more checklist, to give members relevant decision-making factors, wherein the system is configured to record member responses to the workflow process to create a log of member decision-making.

* * * * *